US012407901B2

(12) United States Patent
Jiang et al.

(10) Patent No.: US 12,407,901 B2
(45) Date of Patent: Sep. 2, 2025

(54) VIDEO PROCESSING METHOD, APPARATUS, AND DEVICE, AND STORAGE MEDIUM

(71) Applicant: Beijing Zitiao Network Technology Co., Ltd., Beijing (CN)

(72) Inventors: Jiaxin Jiang, Beijing (CN); Yi Yang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/816,278

(22) Filed: Aug. 27, 2024

(65) Prior Publication Data

US 2024/0422397 A1 Dec. 19, 2024

Related U.S. Application Data

(63) Continuation of application No. PCT/CN2023/098512, filed on Jun. 6, 2023.

(30) Foreign Application Priority Data

Jun. 23, 2022 (CN) .......................... 202210725231.3

(51) Int. Cl.
  *H04N 21/472* (2011.01)
  *H04N 21/431* (2011.01)
(52) U.S. Cl.
  CPC ..... *H04N 21/47217* (2013.01); *H04N 21/431* (2013.01)
(58) Field of Classification Search
  None
  See application file for complete search history.

(56) References Cited

U.S. PATENT DOCUMENTS

| 8,839,108 B2 * | 9/2014 | Joo | G11B 27/34 345/619 |
| 2011/0167347 A1 * | 7/2011 | Joo | G11B 27/34 715/716 |

(Continued)

FOREIGN PATENT DOCUMENTS

| CN | 105812889 A | 7/2016 |
| CN | 106658201 A | 5/2017 |

(Continued)

OTHER PUBLICATIONS

China National Intellectual Property Administration, Office Action and Search Report Issued in Application No. 202210725231.3, Jun. 21, 2023, 15 pages.

(Continued)

*Primary Examiner* — Toan H Vu
(74) *Attorney, Agent, or Firm* — Alleman Hall & Tuttle LLP

(57) ABSTRACT

The present disclosure provides a video processing method, apparatus, and device, and a storage medium. The method includes: when a press event corresponding to a preset drag operation for a progress bar cursor on a video playback page is received, firstly switching the progress bar cursor to a first multimedia material corresponding to the preset drag operation; and then, moving and displaying the first multimedia material on a video playback progress bar based on a drag trajectory corresponding to the preset drag operation, where content of the first multimedia material is related to content of a target video displayed on the video playback page, and a display position of the first multimedia material is used to represent a playback progress of the target video on the video playback page.

17 Claims, 3 Drawing Sheets

(56) References Cited

U.S. PATENT DOCUMENTS

| | | | |
|---|---|---|---|
| 2013/0011120 A1 | 1/2013 | Tanaka et al. | |
| 2013/0227414 A1 | 8/2013 | Hwang et al. | |
| 2015/0074700 A1* | 3/2015 | Danovitz | H04N 21/2668 |
| | | | 725/112 |
| 2015/0153943 A1 | 6/2015 | Wang et al. | |
| 2017/0289619 A1* | 10/2017 | Xu | H04N 21/25866 |
| 2018/0041563 A1* | 2/2018 | Yoden | H04L 67/02 |
| 2019/0361500 A1* | 11/2019 | Wu | G06F 3/017 |
| 2020/0275161 A1* | 8/2020 | Yan | H04N 21/47217 |
| 2021/0012761 A1* | 1/2021 | Song | G06F 16/683 |
| 2022/0374144 A1* | 11/2022 | Xiao | G06F 3/04886 |
| 2023/0017489 A1* | 1/2023 | Gupta | H04N 21/8549 |

FOREIGN PATENT DOCUMENTS

| | | |
|---|---|---|
| CN | 106713965 A | 5/2017 |
| CN | 106935254 A | 7/2017 |
| CN | 109151553 A | 1/2019 |
| CN | 109286846 A | 1/2019 |
| CN | 110446093 A | 11/2019 |
| CN | 306078970 S | 9/2020 |
| CN | 306761206 S | 8/2021 |
| CN | 114415928 A | 4/2022 |
| CN | 307349046 S | 5/2022 |
| CN | 114640876 A | 6/2022 |
| CN | 115119064 A | 9/2022 |
| JP | 2016024671 A | 2/2016 |
| JP | 2017103529 A | 6/2017 |
| KR | 20120083123 A | 7/2012 |
| WO | 2017166480 A1 | 10/2017 |

OTHER PUBLICATIONS

China National Intellectual Property Administration, Office Action and Search Report Issued in Application No. 202210725231.3, Nov. 10, 2023, 26 pages.
ISA China National Intellectual Property Administration, International Search Report Issued in Application No. PCT/CN2023/098512, Sep. 24, 2023, 7 pages.
ISA China National Intellectual Property Administration, Written Opinion Issued in Application No. PCT/CN2023/098512, Sep. 24, 2023, 4 pages.
ISA China National Intellectual Property Administration, Written Opinion Issued in Application No. PCT/CN2023/098512, Oct. 7, 2023, 4 pages.
"*Tianguan i* The reactinary progress bar makes the small silver plate dance," Bilibili, Available Online at https://www.bilibili.com/video/BV17y4y1B75W/?spm_id_from=333.999.0.0&vd_source=53bca16f14a27f9c4ec7f754a5e848fb, Retrieved on Aug. 20, 2024, 4 pages.
"Butterfly, white gauze too Xianqi," Sohu, Available Online at https://www.sohu.com/a/428592811_486812, Oct. 31, 2020, 4 pages.
Extended European Search Report for European Application No. 23826146.5, mailed May 7, 2025, 9 pages.
Japan Patent Office, Office Actiom issued in Application No. 2024-550591, Jun. 24, 2025, 6 pages.

* cited by examiner

FIG. 1
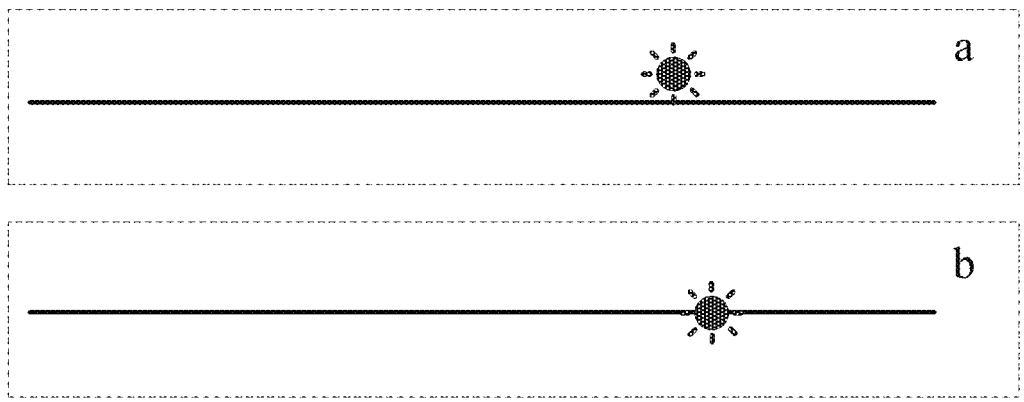
FIG. 2
FIG. 3

VIDEO PROCESSING METHOD, APPARATUS, AND DEVICE, AND STORAGE MEDIUM

CROSS-REFERENCE TO RELATED APPLICATIONS

The present application is a continuation application of PCT/CN2023/098512 filed Jun. 6, 2023, which is based on and claims priority to Chinese Application No. 202210725231.3, filed on Jun. 23, 2022, each of the aforementioned applications is incorporated herein by reference in its entirety.

TECHNICAL FIELD

The present disclosure relates to the field of data processing, and in particular, to a video processing method, apparatus, and device, and a storage medium.

BACKGROUND

With the continuous development of video processing technologies, people have increasingly diverse requirements for related functions in a video playback process.

SUMMARY

To solve the foregoing technical problem, embodiments of the present disclosure provide a video processing solution.

According to a first aspect, the present disclosure provides a video processing method. The method includes:
  in response to a press event corresponding to a preset drag operation for a progress bar cursor on a video playback page, switching the progress bar cursor to display a first multimedia material corresponding to the preset drag operation, where a target video is displayed on the video playback page, and content of the first multimedia material is related to content of the target video; and
  moving and displaying the first multimedia material on a video playback progress bar based on a drag trajectory corresponding to the preset drag operation, where a display position of the first multimedia material on the video playback progress bar is used to represent a playback progress of the target video on the video playback page.

In some embodiments, after the moving and displaying the first multimedia material along a drag trajectory corresponding to the preset drag operation, the method further includes:
  when it is monitored that display duration of the first multimedia material reaches preset first duration, switching display from the first multimedia material to a second multimedia material corresponding to the preset drag operation, where content of the second multimedia material is related to the content of the first multimedia material; and
  moving and displaying the second multimedia material on the video playback progress bar based on the drag trajectory corresponding to the preset drag operation.

In some embodiments, after the moving and displaying the second multimedia material along the drag trajectory corresponding to the preset drag operation, the method further includes:
  in response to a lift event corresponding to the preset drag operation, switching display from the second multimedia material to a third multimedia material corresponding to the preset drag operation, where content of the third multimedia material is related to the content of the second multimedia material; and
  displaying the third multimedia material based on the video playback progress bar on the video playback page.

In some embodiments, after the moving and displaying the first multimedia material along a drag trajectory corresponding to the preset drag operation, the method further includes:
  if it is determined that the display duration of the first multimedia material does not reach the preset first duration, and a lift event corresponding to the preset drag operation is monitored, switching display from the first multimedia material to a fourth multimedia material corresponding to the preset drag operation, where content of the fourth multimedia material is related to the content of the first multimedia material; and
  displaying the fourth multimedia material based on the video playback progress bar on the video playback page.

In some embodiments, the first multimedia material is a first animation, the second multimedia material is a second image, the second image is a preset frame image in the first animation, the third multimedia material is a third animation, and content of the first animation, content of the second image, and content of the third animation are related.

In some embodiments, the preset drag operation is a forward drag operation or a backward drag operation for the progress bar cursor, the forward drag operation corresponds to a forward control operation for the playback progress of the target video on the video playback page, and the backward drag operation corresponds to a backward control operation for the playback progress of the target video.

In some embodiments, content of first multimedia materials respectively corresponding to the forward drag operation and the backward drag operation that have a correspondence is related.

In some embodiments, the content of the first multimedia material is related to a drag direction corresponding to the preset drag operation.

In some embodiments, the video playback progress bar on the video playback page is located below the first multimedia material or in a center of the first multimedia material.

According to a second aspect, the present disclosure provides a video processing apparatus. The apparatus includes:
  a first display switching module configured to: in response to a press event corresponding to a preset drag operation for a progress bar cursor on a video playback page, switch the progress bar cursor to display a first multimedia material corresponding to the preset drag operation; and
  a first movement and display module configured to move and display the first multimedia material based on a drag trajectory corresponding to the preset drag operation, where a display position of the first multimedia material is used to represent a video playback progress on the video playback page.

According to a third aspect, the present disclosure provides a computer-readable storage medium having instructions stored therein. The instructions, when run on a terminal device, cause the terminal device to implement the method described in the present disclosure.

According to a fourth aspect, the present disclosure provides a video processing device. The device includes: a memory and a processor, where a computer program is stored in the memory, the computer program is capable of running by the processor, and when the computer program is executed by the processor, the method described in the present disclosure is implemented.

According to a fifth aspect, the present disclosure provides a computer program product. The computer program product includes a computer program or instructions. The computer program or instructions, when executed by a processor, cause the method according to the present disclosure to be implemented.

According to a sixth aspect, the present disclosure provides a computer program. The computer program includes program code that, when executed by a processor, causes the method according to the present disclosure to be implemented.

BRIEF DESCRIPTION OF THE DRAWINGS

The accompanying drawings herein, which are incorporated into and form a part of the description, illustrate the embodiments in line with the present disclosure and are used in conjunction with the description to explain the principles of the present disclosure.

In order to more clearly illustrate the technical solutions in the embodiments of the present disclosure or in the prior art, the accompanying drawings for describing the embodiments or the prior art will be briefly described below. Apparently, those of ordinary skill in the art may still derive other drawings from these accompanying drawings without creative efforts.

FIG. 1 is a schematic diagram of a video playback progress bar;

FIG. 2 is a flowchart of a video processing method according to an embodiment of the present disclosure;

FIG. 3 is a schematic diagram of a progress bar cursor on a video playback progress bar according to an embodiment of the present disclosure;

DETAILED DESCRIPTION

Figure 4:
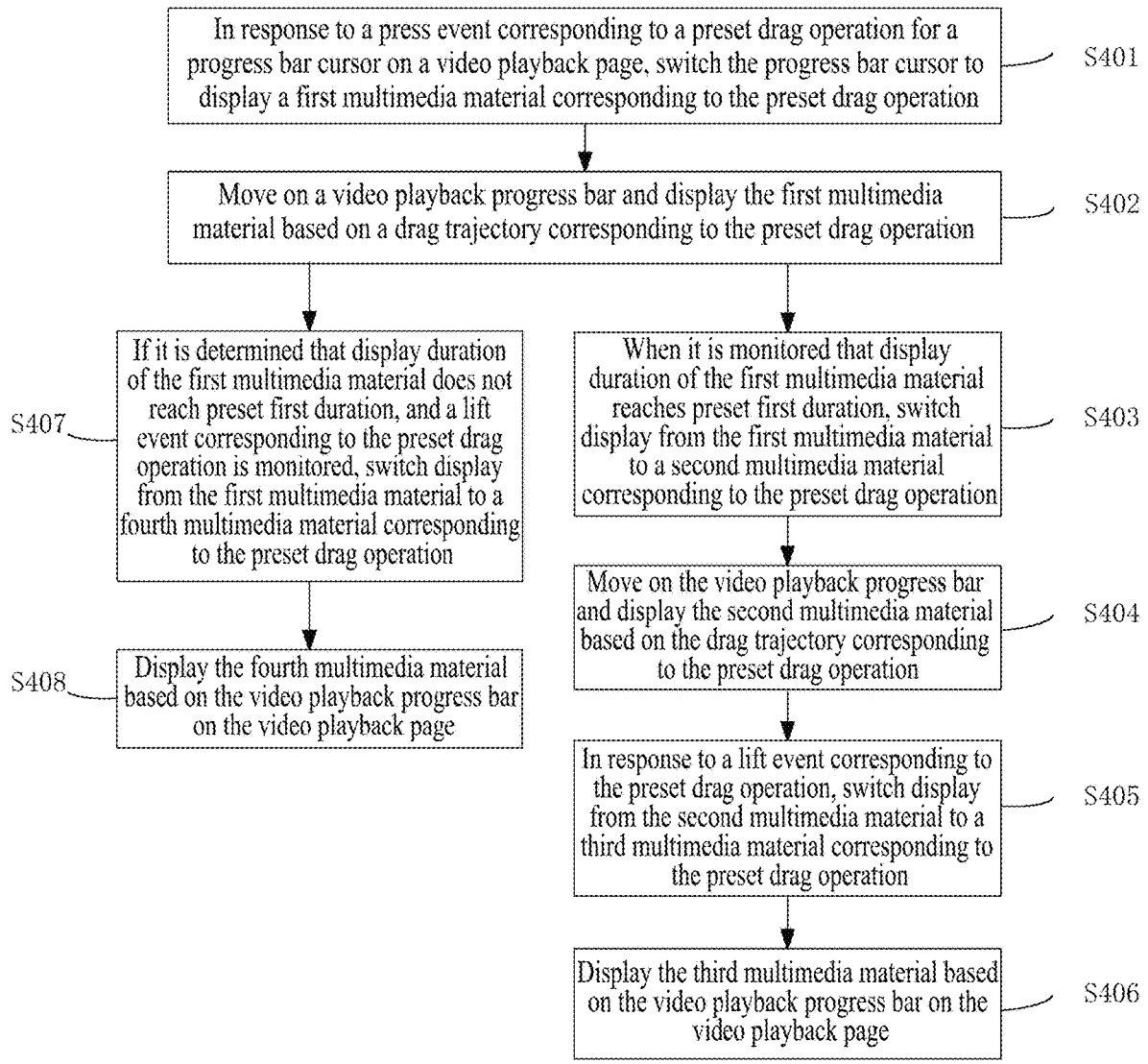
FIG. 4 is a flowchart of another video processing method according to an embodiment of the present disclosure.

For a clearer understanding of the above objectives, features, and advantages of the present disclosure, the solutions of the present disclosure will be further described below. It should be noted that the embodiments of the present disclosure and features in the embodiments may be combined with each other without conflict.

Many specific details are set forth in the following description to facilitate a full understanding of the present disclosure. However, the present disclosure may also be implemented in other ways different from those described herein. Apparently, the embodiments in the description are only some rather than all of the embodiments of the present disclosure.

A video playback progress bar is used to indicate a playback progress of a video being displayed on a video playback page. A progress bar cursor is on the video playback progress bar. A user drags the progress bar cursor on the video playback progress bar, so that a forward or backward control operation on the playback progress of the video can be triggered. FIG. 1 is a schematic diagram of a video playback progress bar. A progress bar cursor 110 is displayed on a video playback progress bar 100.

In the related art, a progress bar cursor on a video playback progress bar has a monotonous display style that is usually a style shown by the progress bar cursor 110 in FIG. 1, and a requirement of a user for diversified functions cannot be met.

How to enrich related functions in a video playback process to improve user experience is a technical problem that needs to be solved urgently at present.

In view of this, an embodiment of the present disclosure provides a video processing solution. When a press event corresponding to a preset drag operation for a progress bar cursor on a video playback page is received, the progress bar cursor is first switched to a first multimedia material corresponding to the preset drag operation, and then the first multimedia material is moved and displayed on a video playback progress bar based on a drag trajectory corresponding to the preset drag operation. Content of the first multimedia material is related to content of a target video displayed on the video playback page, and a display position of the first multimedia material is used to represent a playback progress of the target video on the video playback page. In this embodiment of the present disclosure, the preset drag operation for the progress bar cursor is used to trigger the progress bar cursor to switch display to the first multimedia material related to the content of the target video, thereby enriching functions related to video playback and improving the user experience.

Based on this, an embodiment of the present disclosure provides a video processing method. FIG. 2 is a flowchart of the video processing method according to this embodiment of the present disclosure. The method includes the following steps.

S201: In response to a press event corresponding to a preset drag operation for a progress bar cursor on a video playback page, switch the progress bar cursor to display a first multimedia material corresponding to the preset drag operation. A target video is displayed on the video playback page, and content of the first multimedia material is related to content of the target video.

According to this embodiment of the present disclosure, the first multimedia material may be a material of any appropriate type. For example, the first multimedia material may be an animation (referred to as a first animation), or may be an image (referred to as a first image).

In this embodiment of the present disclosure, in a process of displaying the target video on the video playback page, a progress bar cursor is displayed on a video playback progress bar of the target video, as shown in FIG. 1. When the press event corresponding to the preset drag operation for the progress bar cursor is monitored, the progress bar cursor is switched to display the first multimedia material corresponding to the preset drag operation. FIG. 3 is a schematic diagram of a progress bar cursor on a video playback progress bar according to an embodiment of the present disclosure. The progress bar cursor 110 on the video playback progress bar in FIG. 1 is switched to display a first multimedia material 301 corresponding to a preset drag operation shown in FIG. 3. Specifically, the video playback progress bar may be located below the first multimedia material, as shown in a; or the video playback progress bar may be located in a center of the first multimedia material, as shown in b. This is not limited in this embodiment of the present disclosure.

Specifically, the switching the progress bar cursor to display a first multimedia material corresponding to the preset drag operation means that an original display style of the progress bar cursor is hidden and the first multimedia material corresponding to the preset drag operation is displayed, which is a display style of the switched progress bar cursor.

The preset drag operation includes a group of press and lift events. Specifically, the preset drag operation for the progress bar cursor is triggered through a group of press, drag, and lift operations. The press event may be an event triggered through an operation such as pressing a mouse, a finger, or a stylus. Correspondingly, the lift event may be an event triggered through an operation such as lifting a mouse, a finger, or a stylus corresponding to the press event.

The preset drag operation may be a forward drag operation or a backward drag operation for the progress bar cursor. Specifically, the forward drag operation corresponds to a forward control operation for a playback progress of a target video on the video playback page, and the backward drag operation corresponds to a backward control operation for the playback progress of the target video.

In some embodiments, if a press event corresponding to the forward drag operation for the progress bar cursor is received, the progress bar cursor is switched to display a first multimedia material corresponding to the forward drag operation. If a press event corresponding to the backward drag operation for the progress bar cursor is received, the progress bar cursor is switched to display a first multimedia material corresponding to the backward drag operation.

In some embodiments, content of the first multimedia materials respectively corresponding to the forward drag operation and the backward drag operation that have a correspondence is related, that is, content of the first multimedia materials corresponding to the forward drag operation and the backward drag operation for the same video is related. Specifically, in this embodiment of the present disclosure, the content of the first multimedia materials corresponding to the forward control operation (that is, the forward drag operation) and the backward control operation (that is, the backward drag operation) for the target video is related.

For example, a first multimedia material corresponding to the forward drag operation is an animation of a snowman running forward, while a first multimedia material corresponding to the backward drag operation is an animation of the snowman moving backward. A user dragging the progress bar cursor forward corresponds to a dynamic effect that the snowman runs forward, while dragging a progress bar backward corresponds to a dynamic effect that the snowman moves backward, thereby implementing an interaction effect between the user and the snowman.

In some embodiments, the content of the first multimedia material is related to a drag direction corresponding to the preset drag operation. For example, the first multimedia material corresponding to the forward drag operation is an animation of a snowman waving from left to right while running forward, and the first multimedia material corresponding to the backward drag operation is an animation of the snowman waving from right to left while running backward.

S202: Move and display the first multimedia material on a video playback progress bar based on a drag trajectory corresponding to the preset drag operation.

A display position of the first multimedia material on the video playback progress bar is used to represent a playback progress of the target video on the video playback page.

In this embodiment of the present disclosure, after the progress bar cursor on the video playback progress bar is switched to display the first multimedia material corresponding to the preset drag operation, the first multimedia material is moved and displayed on the video playback progress bar along the drag trajectory corresponding to the preset drag operation. The playback progress of the target video is indicated to the user based on the display position of the first multimedia material on the video playback progress bar.

The content of the first multimedia material is related to the content of the target video, for example, the target video is a Christmas-related video, the first multimedia material may be a material related to a Christmas element such as a snowman animation, a snowman image, or a Santa Claus animation. Therefore, a progress bar cursor on a video playback progress bar of the target video is switched to display the first multimedia material, so that the sense of immersion of a user can be enhanced and user experience can be improved.

In the video processing method provided in this embodiment of the present disclosure, when the press event corresponding to the preset drag operation for the progress bar cursor on the video playback page is received, the progress bar cursor is first switched to the first multimedia material corresponding to the preset drag operation, and then the first multimedia material is moved and displayed on the video playback progress bar based on the drag trajectory corresponding to the preset drag operation. The content of the first multimedia material is related to the content of the target video displayed on the video playback page, and the display position of the first multimedia material is used to represent the playback progress of the target video on the video playback page. In this embodiment of the present disclosure, the preset drag operation for the progress bar cursor is used to trigger the progress bar cursor to switch display to the first multimedia material related to the content of the target video, thereby enriching functions related to video playback and improving the user experience.

Additionally or optionally, an embodiment of the present disclosure further provides another video processing method. FIG. 4 is a flowchart of another video processing method according to this embodiment of the present disclosure. The method includes the following steps.

S401: In response to a press event corresponding to a preset drag operation for a progress bar cursor on a video playback page, switch the progress bar cursor to display a first multimedia material corresponding to the preset drag operation.

A target video is displayed on the video playback page, and content of the first multimedia material is related to content of the target video. According to this embodiment of the present disclosure, the first multimedia material may be a material of any appropriate type. For example, the first multimedia material may be an animation (referred to as a first animation), or may be an image (referred to as a first image).

S402: Move and display the first multimedia material on a video playback progress bar based on a drag trajectory corresponding to the preset drag operation.

A display position of the first multimedia material on the video playback progress bar is used to represent a playback progress of the target video on the video playback page.

S401 and S402 in this embodiment of the present disclosure are the same as S201 and S202 in the foregoing embodiment, and can be understood with reference to the foregoing embodiment. Details are not described herein again.

S403: When it is monitored that display duration of the first multimedia material reaches preset first duration, switch display from the first multimedia material to a second multimedia material corresponding to the preset drag operation.

Content of the second multimedia material is related to the content of the first multimedia material.

In this embodiment of the present disclosure, in a process of moving and displaying the first multimedia material on the video playback progress bar, the display duration of the first multimedia material is monitored in real time. When it is monitored that the display duration of the first multimedia material reaches the preset first duration, display is switched from the first multimedia material displayed on the video playback progress bar to the second multimedia material corresponding to the preset drag operation.

The second multimedia material may be a material of any appropriate type that is the same as or different from that of the first multimedia material. For example, the second multimedia material may be an animation (referred to as a second animation below) or an image (referred to as a second image below) related to the content of the first multimedia material. The preset first duration may be predetermined based on a display requirement, for example, 150 ms.

S404: Move and display the second multimedia material on the video playback progress bar based on the drag trajectory corresponding to the preset drag operation.

In actual applications, after display is switched from the first multimedia material displayed on the video playback progress bar to the second multimedia material corresponding to the preset drag operation, the second multimedia material is moved and displayed on the video playback progress bar based on the drag trajectory corresponding to the preset drag operation.

S405: In response to a lift event corresponding to the preset drag operation, switch display from the second multimedia material to a third multimedia material corresponding to the preset drag operation.

Content of the third multimedia material is related to the content of the second multimedia material.

In this embodiment of the present disclosure, after the press event corresponding to the preset operation is monitored, the lift event corresponding to the preset drag operation is monitored in real time. When the lift event corresponding to the preset drag operation is detected, display is switched from the second multimedia material displayed on the video playback progress bar to the third multimedia material corresponding to the preset drag operation.

The third multimedia material may be a material of any appropriate type that is the same as or different from that of the first multimedia material and/or the second multimedia material. For example, the third multimedia material may be an animation (referred to as a third animation below) or an image (referred to as a third image below) related to the content of the second multimedia material.

S406: Display the third multimedia material based on the video playback progress bar on the video playback page.

In this embodiment of the present disclosure, after display is switched from the second multimedia material displayed on the video playback progress bar to the third multimedia material corresponding to the preset drag operation, the third multimedia material is displayed on the video playback progress bar on the video playback page.

If the target video on the video playback page is in a playback state, the third multimedia material is played back along the video playback progress bar of the target video, to indicate a playback progress of the target video.

If the target video on the video playback page is in a pause state, the third multimedia material is displayed at an occurrence position of the lift event corresponding to the preset drag operation.

S407: If it is determined that the display duration of the first multimedia material does not reach the preset first duration, and a lift event corresponding to the preset drag operation is monitored, switch display from the first multimedia material to a fourth multimedia material corresponding to the preset drag operation.

Content of the fourth multimedia material is related to the content of the first multimedia material.

In this embodiment of the present disclosure, when the display duration of the first multimedia material does not reach the preset first duration, if the lift event corresponding to the preset drag operation is monitored, display may be switched from the first multimedia material on the video playback progress bar to the fourth multimedia material corresponding to the preset drag operation.

Specifically, the fourth multimedia material may be a material of any appropriate type that is the same as or different from that of the first multimedia material, the second multimedia material, and/or the third multimedia material. For example, the fourth multimedia material may be an animation (referred to as a fourth animation below) or an image (referred to as a fourth image below) related to the content of the first multimedia material.

In some embodiments, the fourth multimedia material may be the same as or different from the third multimedia material.

S408: Display the fourth multimedia material based on the video playback progress bar on the video playback page.

In this embodiment of the present disclosure, after display is switched from the first multimedia material displayed on the video playback progress bar to the fourth multimedia material corresponding to the preset drag operation, the fourth multimedia material is displayed on the video playback progress bar on the video playback page.

In the video processing method provided in this embodiment of the present disclosure, the preset drag operation for the progress bar cursor is used to trigger the progress bar cursor to switch display to a material, for example, the first multimedia material, related to the content of the target video, thereby further enriching functions related to video playback and improving the user experience.

An exemplary implementation of an embodiment of the present disclosure is described below. In an application scenario, in response to a press event corresponding to a preset drag operation for a progress bar cursor on a video playback page, the progress bar cursor is switched to display a first animation corresponding to the preset drag operation; when it is monitored that playback duration of the first animation reaches preset first duration, display is switched from the first animation to a preset frame image (that is, a second image) in the first animation; and when a lift event corresponding to the preset drag event is monitored, display is switched from the preset frame image to a third animation. Content of the first animation, content of the second image, and content of the third animation are related, and data of the first animation and data of the third animation may be stored based on a json file.

Figure 5:
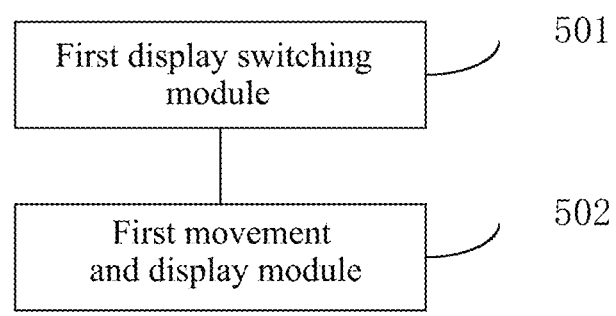
FIG. 5 is a schematic diagram of a structure of a video processing apparatus according to an embodiment of the present disclosure.

The present disclosure further provides a video processing apparatus. FIG. 5 is a schematic diagram of a structure of the video processing apparatus according to an embodiment of the present disclosure. The apparatus includes:
- a first display switching module 501 configured to: in response to a press event corresponding to a preset drag operation for a progress bar cursor on a video playback page, switch the progress bar cursor to display a first multimedia material corresponding to the preset drag operation, where for example, the first multimedia material may be a first animation or a first image; and
- a first movement and display module 502 configured to move and display the first multimedia material based on a drag trajectory corresponding to the preset drag operation, where a display position of the first multimedia material is used to represent a video playback progress on the video playback page.

In some embodiments, the apparatus further includes:
- a second display switching module configured to: when it is monitored that display duration of the first multimedia material reaches preset first duration, switch display from the first multimedia material to a second multimedia material corresponding to the preset drag operation, where content of the second multimedia material is related to content of the first multimedia material; and
- a second movement and display module configured to move and display the second multimedia material on the video playback progress bar based on the drag trajectory corresponding to the preset drag operation.

In some embodiments, the apparatus further includes:
- a third display switching module configured to: in response to a lift event corresponding to the preset drag operation, switch display from the second multimedia material to a third multimedia material corresponding to the preset drag operation, where content of the third multimedia material is related to the content of the second multimedia material; and
- a first display module configured to display the third multimedia material based on the video playback progress bar on the video playback page.

In some embodiments, the apparatus further includes:
- a fourth display switching module configured to: if it is determined that the display duration of the first multimedia material does not reach the preset first duration, and a lift event corresponding to the preset drag operation is monitored, switch display from the first multimedia material to a fourth multimedia material corresponding to the preset drag operation, where content of the fourth multimedia material is related to the content of the first multimedia material; and
- a second display module configured to display the fourth multimedia material based on the video playback progress bar on the video playback page.

In some embodiments, the first multimedia material is a first animation, the second multimedia material is a second image, the second image is a preset frame image in the first animation, the third multimedia material is a third animation, and content of the first animation, content of the second image, and content of the third animation are related.

In some embodiments, the preset drag operation is a forward drag operation or a backward drag operation for the progress bar cursor, the forward drag operation corresponds to a forward control operation for the playback progress of the target video on the video playback page, and the backward drag operation corresponds to a backward control operation for the playback progress of the target video.

In some embodiments, content of first multimedia materials respectively corresponding to the forward drag operation and the backward drag operation that have a correspondence is related.

In some embodiments, the content of the first multimedia material is related to a drag direction corresponding to the preset drag operation.

In some embodiments, the video playback progress bar on the video playback page is located below the first multimedia material or in a center of the first multimedia material.

It should be noted that the foregoing various modules are merely logical modules obtained through division according to specific functions implemented by the modules, and are not used to limit specific implementations. For example, the modules may be implemented by software, hardware, or a combination of software and hardware. In actual implementation, the foregoing various modules may be implemented as separate physical entities, or may be implemented by a single entity (such as a processor (a CPU, a DSP, or the like) or an integrated circuit). In addition, the foregoing various modules are shown with dotted lines in the accompanying drawings to indicate that these modules may not actually exist, and the operations/functions implemented by the modules may be implemented by the apparatus or a processing circuit.

For the video processing apparatus provided in this embodiment of the present disclosure, when the press event corresponding to the preset drag operation for the progress bar cursor on the video playback page is received, the progress bar cursor is first switched to the first multimedia material corresponding to the preset drag operation, and then the first multimedia material is moved and displayed on the video playback progress bar based on the drag trajectory corresponding to the preset drag operation. The content of the first multimedia material is related to content of the target video displayed on the video playback page, and the display position of the first multimedia material is used to represent the playback progress of the target video on the video playback page. In this embodiment of the present disclosure, the preset drag operation for the progress bar cursor is used to trigger the progress bar cursor to switch display to the first multimedia material related to the content of the target video, thereby enriching functions related to video playback and improving the user experience.

In addition to the method and apparatus described above, an embodiment of the present disclosure further provides a computer-readable storage medium having instructions stored therein. The instructions, when run on a terminal device, cause the terminal device to implement the video processing method described in the embodiments of the present disclosure.

An embodiment of the present disclosure further provides a computer program product. The computer program product includes a computer program or instructions. When the computer program or instructions, when executed by a processor, cause the video processing method described in the embodiments of the present disclosure to be implemented.

An embodiment of the present disclosure further provides a data processing device. The device includes: a memory and a processor, where a computer program is stored in the memory, and when the computer program is executed by the processor, the video processing method described in the embodiments of the present disclosure can be implemented.

An embodiment of the present disclosure further provides a computer program. The computer program includes program code. When the program code is executed by a processor, the video processing method described in the embodiments of the present disclosure is implemented.

Figure 6:
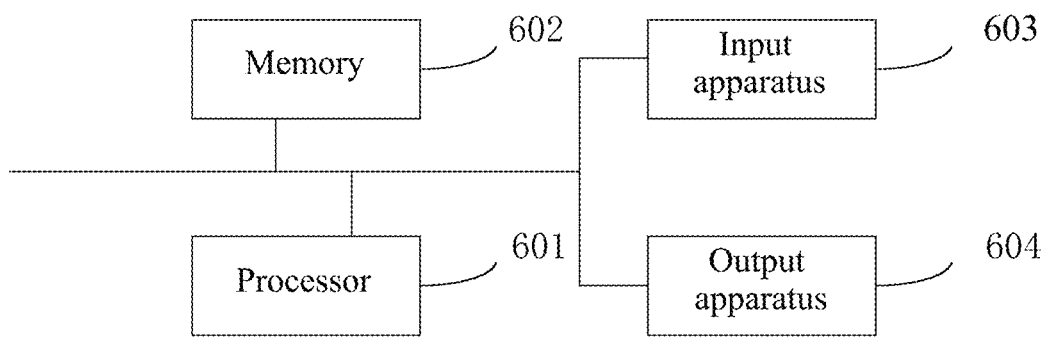
FIG. 6 is a schematic diagram of a structure of a video processing device according to an embodiment of the present disclosure.

In addition, an embodiment of the present disclosure further provides a video processing device that can implement the video processing solution according to the embodiments of the present disclosure. As shown in FIG. 6, the video processing device may include:

a processor 601, a memory 602, an input apparatus 603, and an output apparatus 604. There may be one or more processors 601 in the video processing device. For example, there is one processor in FIG. 6. In some embodiments of the present disclosure, the processor 601, the memory 602, the input apparatus 603, and the output apparatus 604 may be connected through a bus or in another manner. For example, they are connected through the bus in FIG. 6.

The memory 602 may be configured to store a software program and a module. The processor 601 performs various functional applications of the video processing device and processes data by running the software program and the module stored in the memory 602. The memory 602 may mainly include a program storage area and a data storage area. The program storage area may store an operating system, an application required by at least one function, and the like. In addition, the memory 602 may include a high-speed random access memory, and may further include a non-volatile memory, such as at least one magnetic disk storage device, a flash memory device, or other volatile solid-state storage devices. The input apparatus 603 may be configured to receive entered numerical or character information, and generate a signal input related to a user setting and function control of the video processing device.

Specifically, in this embodiment, the processor 601 loads an executable file corresponding to a process of one or more applications into the memory 602 in accordance with the following instructions, and the processor 601 runs the application stored in the memory 602, to implement various functions of the above video processing device.

It should be noted that the relational terms such as "first" and "second" herein are only used to distinguish one entity or operation from another, and do not necessarily require or imply that any actual relationship or sequence exists between these entities or operations. Moreover, the terms "include" and "comprise", or any of their variants are intended to cover a non-exclusive inclusion, so that a process, method, article, or device that includes a list of elements not only includes those elements but also includes other elements that are not expressly listed, or further includes elements inherent to such process, method, article, or device. In the absence of more restrictions, an element defined by "including a . . . " does not exclude another identical element in a process, method, article, or device that includes the element.

The above description illustrates merely specific implementations of the present disclosure, so that a person skilled in the art can understand or implement the present disclosure. Various modifications to these embodiments are apparent to a person skilled in the art, and the general principle defined herein may be practiced in other embodiments without departing from the spirit or scope of the present disclosure. Therefore, the present disclosure is not limited to the embodiments described herein but is to be accorded the broadest scope consistent with the principle and novel features disclosed herein.

What is claimed is:

1. A video processing method, the method comprising:
   in response to a press event corresponding to a preset drag operation for a progress bar cursor on a video playback page, switching the progress bar cursor to display a first multimedia material corresponding to the preset drag operation, wherein a target video is displayed on the video playback page, and content of the first multimedia material is related to content of the target video;
   moving and displaying the first multimedia material on a video playback progress bar based on a drag trajectory corresponding to the preset drag operation, wherein a display position of the first multimedia material on the video playback progress bar is used to represent a playback progress of the target video on the video playback page;
   when it is monitored that a display duration of the first multimedia material reaches a preset first duration, switching display from the first multimedia material to a second multimedia material corresponding to the preset drag operation, wherein content of the second multimedia material is related to the content of the first multimedia material; and
   moving and displaying the second multimedia material on the video playback progress bar based on the drag trajectory corresponding to the preset drag operation.

2. The method according to claim 1, wherein after the moving and displaying the second multimedia material based on the drag trajectory corresponding to the preset drag operation, the method further comprises:
   in response to a lift event corresponding to the preset drag operation, switching display from the second multimedia material to a third multimedia material corresponding to the preset drag operation, wherein content of the third multimedia material is related to the content of the second multimedia material; and
   displaying the third multimedia material based on the video playback progress bar on the video playback page.

3. The method according to claim 1, wherein after the moving and displaying the first multimedia material based on a drag trajectory corresponding to the preset drag operation, the method further comprises:
   if it is determined that the display duration of the first multimedia material does not reach the preset first duration, and a lift event corresponding to the preset drag operation is monitored, switching display from the first multimedia material to a fourth multimedia material corresponding to the preset drag operation, wherein content of the fourth multimedia material is related to the content of the first multimedia material; and
   displaying the fourth multimedia material based on the video playback progress bar on the video playback page.

4. The method according to claim 2, wherein the first multimedia material is a first animation, the second multimedia material is a second image, the second image is a preset frame image in the first animation, the third multimedia material is a third animation, and content of the first animation, content of the second image, and content of the third animation are related.

5. The method according to claim 1, wherein the preset drag operation is a forward drag operation or a backward drag operation for the progress bar cursor, the forward drag operation corresponds to a forward control operation for the playback progress of the target video on the video playback page, and the backward drag operation corresponds to a backward control operation for the playback progress of the target video.

6. The method according to claim 5, wherein content of first multimedia materials respectively corresponding to the forward drag operation and the backward drag operation that have a correspondence is related.

7. The method according to claim 5, wherein the content of the first multimedia material is related to a drag direction corresponding to the preset drag operation.

8. The method according to claim 1, wherein the video playback progress bar on the video playback page is located below the first multimedia material or in a center of the first multimedia material.

9. A non-transitory computer-readable storage medium having instructions stored therein, wherein the instructions, when run on a terminal device, cause the terminal device to implement:
   in response to a press event corresponding to a preset drag operation for a progress bar cursor on a video playback page, switching the progress bar cursor to display a first multimedia material corresponding to the preset drag operation, wherein a target video is displayed on the video playback page, and content of the first multimedia material is related to content of the target video;
   moving and displaying the first multimedia material on a video playback progress bar based on a drag trajectory corresponding to the preset drag operation, wherein a display position of the first multimedia material on the video playback progress bar is used to represent a playback progress of the target video on the video playback page;
   when it is monitored that a display duration of the first multimedia material reaches a preset first duration, switching display from the first multimedia material to a second multimedia material corresponding to the preset drag operation, wherein content of the second multimedia material is related to the content of the first multimedia material; and
   moving and displaying the second multimedia material on the video playback progress bar based on the drag trajectory corresponding to the preset drag operation.

10. The non-transitory computer-readable storage medium according to claim 9, wherein after the moving and displaying the second multimedia material based on the drag trajectory corresponding to the preset drag operation, the instructions, when run on a terminal device, cause the terminal device to further implement:
   in response to a lift event corresponding to the preset drag operation, switching display from the second multimedia material to a third multimedia material corresponding to the preset drag operation, wherein content of the third multimedia material is related to the content of the second multimedia material; and
   displaying the third multimedia material based on the video playback progress bar on the video playback page.

11. The non-transitory computer-readable storage medium according to claim 9, wherein after the moving and displaying the first multimedia material based on a drag trajectory corresponding to the preset drag operation, the instructions, when run on a terminal device, cause the terminal device to further implement:
   if it is determined that the display duration of the first multimedia material does not reach the preset first duration, and a lift event corresponding to the preset drag operation is monitored, switching display from the first multimedia material to a fourth multimedia material corresponding to the preset drag operation, wherein content of the fourth multimedia material is related to the content of the first multimedia material; and
   displaying the fourth multimedia material based on the video playback progress bar on the video playback page.

12. The non-transitory computer-readable storage medium according to claim 9, wherein the preset drag operation is a forward drag operation or a backward drag operation for the progress bar cursor, the forward drag operation corresponds to a forward control operation for the playback progress of the target video on the video playback page, and the backward drag operation corresponds to a backward control operation for the playback progress of the target video.

13. The non-transitory computer-readable storage medium according to claim 9, wherein the video playback progress bar on the video playback page is located below the first multimedia material or in a center of the first multimedia material.

14. A video processing device, comprising: a memory and a processor, wherein a computer program is stored in the memory, and wherein the computer program, when executed by the processor, causes the processor to implement:
   in response to a press event corresponding to a preset drag operation for a progress bar cursor on a video playback page, switching the progress bar cursor to display a first multimedia material corresponding to the preset drag operation, wherein a target video is displayed on the video playback page, and content of the first multimedia material is related to content of the target video;
   moving and displaying the first multimedia material on a video playback progress bar based on a drag trajectory corresponding to the preset drag operation, wherein a display position of the first multimedia material on the video playback progress bar is used to represent a playback progress of the target video on the video playback page;
   when it is monitored that a display duration of the first multimedia material reaches a preset first duration, switching display from the first multimedia material to a second multimedia material corresponding to the preset drag operation, wherein content of the second multimedia material is related to the content of the first multimedia material; and
   moving and displaying the second multimedia material on the video playback progress bar based on the drag trajectory corresponding to the preset drag operation.

15. The video processing device according to claim 14, wherein after the moving and displaying the second multimedia material based on the drag trajectory corresponding to the preset drag operation, the computer program, when executed by the processor, causes the processor to further implement:
   in response to a lift event corresponding to the preset drag operation, switching display from the second multimedia material to a third multimedia material corresponding to the preset drag operation, wherein content of the third multimedia material is related to the content of the second multimedia material; and
   displaying the third multimedia material based on the video playback progress bar on the video playback page.

16. The video processing device according to claim 14, wherein after the moving and displaying the first multimedia material based on a drag trajectory corresponding to the preset drag operation, the computer program, when executed by the processor, causes the processor to further implement:

if it is determined that the display duration of the first multimedia material does not reach the preset first duration, and a lift event corresponding to the preset drag operation is monitored, switching display from the first multimedia material to a fourth multimedia material corresponding to the preset drag operation, wherein content of the fourth multimedia material is related to the content of the first multimedia material; and displaying the fourth multimedia material based on the video playback progress bar on the video playback page.

17. The video processing device according to claim 14, wherein the preset drag operation is a forward drag operation or a backward drag operation for the progress bar cursor, the forward drag operation corresponds to a forward control operation for the playback progress of the target video on the video playback page, and the backward drag operation corresponds to a backward control operation for the playback progress of the target video.

* * * * *